(12) United States Patent
Ambrose et al.

(10) Patent No.: US 7,868,120 B2
(45) Date of Patent: *Jan. 11, 2011

(54) LOW TEMPERATURE, MOISTURE CURABLE COATING COMPOSITIONS AND RELATED METHODS

(75) Inventors: Ronald R. Ambrose, Pittsburgh, PA (US); Anthony M. Chasser, Allison Park, PA (US); Susan F. Donaldson, Allison Park, PA (US); Gregory J. McCollum, Gibsonia, PA (US); William H. Retsch, Jr., Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 659 days.

This patent is subject to a terminal disclaimer.

(21) Appl. No.: 11/839,155

(22) Filed: Aug. 15, 2007

(65) Prior Publication Data

US 2008/0075870 A1 Mar. 27, 2008

Related U.S. Application Data

(60) Provisional application No. 60/826,431, filed on Sep. 21, 2006.

(51) Int. Cl.
*C08G 77/26* (2006.01)
(52) U.S. Cl. .......................................... 528/38; 528/26
(58) Field of Classification Search .................. 528/38, 528/26
See application file for complete search history.

(56) References Cited

U.S. PATENT DOCUMENTS

| | | | | |
|---|---|---|---|---|
| 4,239,539 A | 12/1980 | Ginsberg et al. | ............ | 106/1.17 |
| 4,250,074 A | 2/1981 | Foscante et al. | ........ | 260/32.8 EP |
| 4,429,082 A | 1/1984 | Lee et al. | ..................... | 525/426 |
| 4,477,628 A | 10/1984 | Kato et al. | .................. | 525/100 |
| 4,603,086 A | 7/1986 | Fujii et al. | .................. | 428/447 |
| 4,678,835 A | 7/1987 | Chang et al. | ................ | 525/100 |
| 4,697,026 A | 9/1987 | Lee et al. | ..................... | 556/418 |
| 5,241,000 A | 8/1993 | Ohmari et al. | | |
| 5,260,350 A | 11/1993 | Wright | ........................ | 522/42 |
| 5,374,483 A | 12/1994 | Wright | | |
| 5,403,535 A | 4/1995 | Blizzard et al. | ............. | 264/293 |
| 5,627,252 A * | 5/1997 | De La Croi Habimana | ... | 528/26 |
| 5,648,173 A | 7/1997 | Blizzard | ..................... | 428/446 |
| 5,703,178 A | 12/1997 | Gasmena | .................... | 525/476 |
| 6,203,607 B1 | 3/2001 | Schoonderwoerd et al. | ..................... | 106/287.11 |
| 6,268,456 B1 | 7/2001 | Gregorovich et al. | ......... | 528/35 |
| 6,281,321 B1 | 8/2001 | Kelly et al. | ................... | 528/17 |
| 6,344,520 B1 | 2/2002 | Greene | ........................ | 525/100 |
| 6,514,584 B1 | 2/2003 | Merlin et al. | ............. | 428/36.7 |
| 6,599,354 B1 | 7/2003 | Schmalstieg et al. | ... | 106/287.11 |
| 6,677,047 B2 | 1/2004 | Matsumura et al. | | |
| 6,713,586 B2 | 3/2004 | Greene | ........................ | 528/34 |
| 6,936,676 B2 | 8/2005 | Okuhira et al. | ............... | 528/25 |
| 7,026,398 B2 | 4/2006 | Monkiewicz et al. | ....... | 525/100 |
| 7,064,174 B2 | 6/2006 | Lewis et al. | ................... | 528/38 |
| 2006/0058451 A1 | 3/2006 | Gommans et al. | ........... | 524/588 |

FOREIGN PATENT DOCUMENTS

| | | |
|---|---|---|
| CA | 2141515 | 8/1995 |
| CA | 2141516 | 12/1995 |
| DE | 199 29 011 A1 | 12/2000 |
| EP | 0 354 378 B1 | 1/1994 |
| JP | 08-107448 A | 4/1996 |
| JP | 09-291135 | * 11/1997 |
| JP | 09291135 A | 11/1997 |
| JP | 2001055443 A | 2/2001 |
| JP | 2001064468 A | 3/2001 |
| JP | 2003238795 A | 8/2003 |
| JP | 2004323660 A | 11/2004 |
| WO | WO 96/16109 | 5/1996 |
| WO | WO 01/44381 A1 | 6/2001 |
| WO | WO 2004/078863 A1 | 9/2004 |

OTHER PUBLICATIONS

"The Influence of Silicon-Containing Acrylate as Active Diluent on the Properties of UV-Cured Epoxydiacrylate Films" by Hongbo Liu at al., European Polymer Journal 40 (2004) 609-613.
"Bismethacrylate-Based Hybrid Monomers via Michael-Addition Reactions" by Ekkehard Müh et al., Macromolecules 2001, 34, 5778-5785.

* cited by examiner

*Primary Examiner*—Kuo-Liang Peng
(74) *Attorney, Agent, or Firm*—Donald R. Palladino

(57) ABSTRACT

Disclosed are low temperature, moisture curable coating compositions, related coated substrates, and methods for coating a substrate. The coating compositions include an ungelled, secondary amine-containing Michael addition reaction product of reactants including a compound comprising more than one site of ethylenic unsaturation, and an aminofunctional silane.

15 Claims, No Drawings

LOW TEMPERATURE, MOISTURE CURABLE COATING COMPOSITIONS AND RELATED METHODS

CROSS-REFERENCE TO RELATED APPLICATIONS

This application claims the benefit of U.S. Provisional Patent Application Ser. No. 60/826,431, filed Sep. 21, 2006.

FIELD OF THE INVENTION

The present invention relates to low temperature, moisture curable coating compositions, related coated substrates, and methods for depositing a coating on a substrate.

BACKGROUND INFORMATION

Low temperature, moisture-curable coating compositions are desirable in many applications. For example, such coating compositions are, in at least some cases, preferable over, for example, thermally-cured or radiation cured coating compositions because (i) little or no energy is required to cure the composition, (ii) the materials from which some substrates are constructed cannot withstand elevated temperature cure conditions, and/or (iii) large or complex articles to be coated may not be convenient for processing through thermal or radiation cure equipment.

Some coating compositions are based on the hydrolysis and condensation of silane based materials that form a crosslinked Si—O—Si matrix. These compositions often form hard, highly crosslinked films, which are limited in flexibility. Therefore, the resultant coatings are often susceptible to chipping or thermal cracking due to embrittlement of the coating film. Moreover, such films can be especially unsuitable for use in coating substrates that can bend or flex, such as elastomeric automotive parts and accessories, for example, elastomeric bumpers and body side moldings, as well as consumer electronics equipment, among other things. The coating compositions applied to such elastomeric substrates typically must be very flexible so the coating can bend or flex with the substrate without cracking.

As a result, it would be desirable to provide low temperature, moisture curable coating compositions that are capable of producing a flexible, crack resistant coating when applied to a substrate and cured. Moreover, it would be desirable to provide such coating compositions that are, in at least some cases, substantially solvent free, sprayable at room temperature, and storage stable.

SUMMARY OF THE INVENTION

In certain respects, the present invention is directed to low temperature, moisture curable coating compositions comprising: (1) an ungelled, secondary amine-containing, Michael addition reaction product of reactants comprising, or, in some cases, consisting essentially of: (a) a compound comprising more than one site of ethylenic unsaturation, and (b) an aminofunctional silane; and (2) a compound comprising functional groups reactive with the secondary amine of component (1), wherein a completely cured coating deposited from the composition is resistant to cracking when applied so as to result in a dry film thickness of up to 20 mils.

In certain respects, the present invention is directed to low temperature, moisture curable coating compositions comprising: (1) an ungelled, secondary amine-containing, Michael addition reaction product of reactants comprising, or, in some cases, consisting essentially of: (a) a compound comprising more than one site of ethylenic unsaturation, and (b) an aminofunctional silane; and (2) a compound comprising functional groups reactive with the secondary amine of component (1), wherein components (1) and (2) are present in the composition in amounts such that the molar ratio of the secondary amines in component (1) to the functional groups reactive with the secondary amines in component (2) is 0.7 to 1.3.

In other respects, the present invention is directed to a compositions comprising: (1) an ungelled, secondary amine-containing, Michael addition reaction product of reactants comprising: (a) a compound comprising more than one site of ethylenic unsaturation, (b) an aminofunctional silane; and (2) a moisture scavenger present in an amount sufficient to produce a composition having a viscosity of no more than D after 42 days at 120° F. when measured in accordance with ASTM D1545-89.

In still other respects, the present invention is directed to multi-pack coating compositions, wherein (A) a first pack comprises (1) an ungelled, secondary amine-containing, Michael addition reaction product of reactants comprising, or, in some cases, consisting essentially of: (a) a compound comprising more than one site of ethylenic unsaturation, and (b) an aminofunctional silane; and (2) a moisture scavenger; and (B) a second pack comprises a compound comprising functional groups reactive with the secondary amines of the Michael addition reaction product.

In yet other respects, the present invention is directed to methods for coating a substrate. These methods comprise: (A) combining the contents of a first package and a second package, wherein (1) the first package comprises: (a) an ungelled, secondary amine-containing, Michael addition reaction product of reactants comprising, or, in some cases, consisting essentially of: (i) a compound comprising more than one site of ethylenic unsaturation, and (ii) an aminofunctional silane; (2) the second package comprises a compound comprising functional groups reactive with the secondary amines of the Michael addition reaction product; and (3) the contents of the first package and the second package are combined such that molar ratio of the secondary amines in the Michael addition reaction product to the functional groups reactive with the secondary amines in the resulting combination is 0.7 to 1.3; (B) applying the combination to at least a portion of the substrate; (C) allowing the combination to coalesce form a substantially continuous film; and (D) allowing the combination to completely cure within 24 hours in the presence of air having a relative humidity of 10 to 100 percent and a temperature −10 to 120° C.

The present invention is also related to, inter alia, substrates at least partially coated with such compositions and by such methods.

DETAILED DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to low temperature, moisture curable coating compositions. As used herein, the term "low temperature, moisture curable" refers to coating compositions that, following application to a substrate, are capable of curing in the presence of ambient air, the air having a relative humidity of 10 to 100 percent, such as 25 to 80 percent, and a temperature in the range of −10 to 120° C., such as 5 to 80° C., in some cases 10 to 60° C. and, in yet other cases, 15 to 40° C. As used herein, the term "cure" refers to a coating wherein any crosslinkable components of the composition are at least partially crosslinked. In certain embodiments, the crosslink density of the crosslinkable components, i.e., the degree of crosslinking, ranges from 5% to 100%, such as 35% to 85%, or, in some cases, 50% to 85% of complete crosslinking. One skilled in the art will understand that the presence and degree of crosslinking, i.e., the crosslink density, can be determined by a variety of methods, such as dynamic mechanical thermal analysis (DMTA) using a Polymer Laboratories MK III DMTA analyzer conducted under nitrogen.

As will also be appreciated by those skilled in the art, the degree of cure can be determined by testing the solvent resistance of a coating to double rubs of methyl ethyl ketone. The higher the number of double rubs with no damage to the coating, the greater the degree of cure. In this test, an index finger holding a double thickness of cheesecloth saturated with methyl ethyl ketone is held at a 45° angle to the coating surface. The rub is made with moderate pressure at a rate of 1 double rub per second. As used herein, when it is stated that a coating is "completely cured" it means that the coating is resistant to 100, in some cases 200, double rubs of methyl ethyl ketone according to the foregoing procedure, with no damage to the coating.

As previously indicated, the low temperature, moisture curable coating compositions of the present invention comprise an ungelled, secondary amine-containing, Michael addition reaction product of reactants comprising a compound comprising more than one site of ethylenic unsaturation, i.e., a polyethylenically unsaturated compound, such as a poly(meth)acrylate. As used herein, the term "(meth)acrylate" is intended to include both methacrylates and acrylates.

As used herein, the term "secondary amine-containing" refers to compounds comprising a secondary amine, which is a functional group wherein two organic substituents are bound to a nitrogen together with one hydrogen. As used herein, the term "ungelled" refers to resins that are substantially free of crosslinking and have an intrinsic viscosity when dissolved in a suitable solvent, as determined, for example, in accordance with ASTM-D1795 or ASTM-D4243. The intrinsic viscosity of the resin is an indication of its molecular weight. A gelled resin, on the other hand, since it is of essentially infinitely high molecular weight, will have an intrinsic viscosity too high to measure. As used herein, a resin (or polymer) that is "substantially free of crosslinking" refers to a reaction product that has a weight average molecular weight (Mw), as determined by gel permeation chromatography, of less than 1,000,000.

In certain embodiments, the compound comprising more than one site of ethylenic unsaturation comprises a polyethylenically unsaturated monomer, such as di- and higher acrylates. Specific examples of suitable polyethylenically unsaturated monomers are diacrylates, such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate, and/or bisphenol A dimethacrylate; triacrylates, such as trimethylolpropane triacrylate, trimethylolpropane trimethacrylate, pentaerythritol monohydroxy triacrylate, and/or trimethylolpropane triethoxy triacrylate; tetraacrylates, such as pentaerythritol tetraacrylate, and/or di-trimethylolpropane tetraacrylate; and/or pentaacrylates, such as dipentaerythritol (monohydroxy) pentaacrylate.

In addition to or in lieu of the aforementioned polyethylenically unsaturated monomers, the ambient curable compositions of the present invention may comprise the Michael addition reaction product of reactants comprising a polyethylenically unsaturated oligomer. As will be appreciated, the term "oligomer" and "polymer" are frequently used interchangeably. Although the term "oligomer" is generally used to describe a relatively short polymer, the term has no generally accepted definition with respect to the number of repeating monomer units. As used herein, therefore, in describing compounds comprising more than one site of ethylenic unsaturation, the terms "oligomer" and "polymer" are meant to be interchangeable.

Examples of some specific polyethylenically unsaturated oligomers suitable for use in the present invention include, for example, urethane acrylates, polyester acrylates and mixtures thereof, particularly those that are free of hydroxyl functional groups. Specific examples of such materials include urethane acrylates, such as Ebecryl 220 and Ebecryl 264 available from Cytec Surface Specialties Inc. and polyester acrylates, such as Ebecryl 80 available from UCB Chemicals.

As previously indicated, in the coating compositions of the present invention, the compound(s) comprising more than one site of ethylenic unsaturation identified above is reacted with an aminofunctional silane. As used herein, the term "aminofunctional silane" refers to a compound having a molecular structure that includes an amine group and a silicon atom.

In certain embodiments, the aminofunctional silane utilized in the coating compositions of the present invention comprises a compound having the formula:

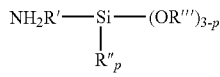

wherein R' is an alkylene group having from 2 to 10 carbon atoms, R" is an alkyl, aryl, alkoxy, or aryloxy group having from 1 to 8 carbon atoms, R''' is an alkyl group having from 1 to 8 carbon atoms, and p has a value of from 0 to 2. In certain embodiments of the present invention, R' is an alkylene group having from 2 to 5 carbon atoms and p is 0, the use of which the inventors have discovered is, in at least some embodiments, best for obtaining dust free films in 10 minutes or less and completely cured films within 24 hours, under the low temperature, moisture cure conditions described earlier.

Specific examples of aminofunctional silanes which are suitable for use in the present invention include aminoethyltriethoxysilane, γ-aminopropyltriethoxysilane, γ-aminopropylmethyldiethoxysilane, γ-aminopropylethyldiethoxysilane, δ-aminopropylphenyldiethoxysilane, γ-aminopropyltrimethoxysilane, δ-aminobutyltriethoxysilane, δ-aminobutylethyldiethoxysilane. In certain embodiments, the aminofunctional silane comprises a γ-aminopropyltrialkoxysilane.

In certain embodiments of the present invention, little or no other reactant, such as a polyamine, is added to the reactant mixture for the Michael addition reaction. As a result, in certain embodiments, the reactants taking part in the Michael addition reaction are substantially free, or, in some cases, completely free of any polyamine. As used herein, the term "polyamine" refers to compounds comprising two or more primary or secondary amino groups. As used herein, the term "substantially free" means that the material being discussed is present in a composition, if at all, as an incidental impurity. In other words, the material does not affect the properties of the composition. As used herein, the term "completely free" means that the material being discussed is not present in a composition at all. The inventors have discovered that the presence of any significant quantity of polyamine can, in at least some cases, result in increased yellowing, the generation of additional unwanted byproducts, and/or an undesirable accelerated building of viscosity in the Michael addition reaction product.

In certain embodiments, the ungelled Michael addition reaction product is formed by simply blending the reactants at room temperature or at a slightly elevated temperature, for example, up to 100° C. The reaction of an amine group with an ethylenically unsaturated group which occurs in this invention is often referred to as a Michael addition reaction. As a result, as used herein, the term "Michael addition reaction product" is meant to refer to the product of such a reaction. Such products can be more heat and light stable than greater acrylyl content-containing products. It should be recognized that slowly adding the aminofunctional silane to the compound comprising more than one site of ethylenic unsaturation results in there being a large excess of acrylate groups to aminofunctional silane. Unless the temperature of the reaction mixture is kept sufficiently low, a gelled product can be the result. It is sometimes better, therefore, to add the unsaturated material to a reaction vessel already containing an aminofunctional silane to obtain an ungelled reaction product. The reaction can be carried out in the absence of a solvent or in the presence of an inert solvent. Examples of suitable inert solvents are toluene, butyl acetate, methyl isobutyl ketone, and ethylene glycol monoethyl ether acetate. It is often desirable that the reaction be conducted in the absence of moisture or in a controlled amount of moisture to avoid unwanted side reactions and possibly gelation.

In certain embodiments, Michael addition reaction is conducted such that the equivalent ratio of the ethylenically unsaturated groups to the amine groups is at least 1:1, in some cases, at least 1.05:1.

In certain embodiments, the Michael addition reaction product identified above is present in the coating compositions of the present invention in an amount of at least 30 percent by weight, such as at least 40 percent by weight, based on the total weight of the composition. In certain embodiments, the Michael addition reaction product identified above is present in the coating compositions of the present invention in an amount of no more than 80 percent by weight, such as no more than 60 percent by weight, with the weight percents being based on the total weight of the composition.

As previously indicated, to produce the coating compositions of the present invention, the previously described Michael addition reaction product is combined with a compound comprising functional groups reactive with the secondary amines present in the Michael addition reaction product. As will be appreciated by those skilled in the art, such functional groups include, but are not limited to, isocyanates, epoxies, and ethylenically unsaturated groups. In certain embodiments, such a compound is selected from a polyepoxide, a compound having two or more ethylenically unsaturated groups, or a mixture thereof.

As used herein, the term "polyepoxide" refers to an epoxy resin having at least two 1,2-epoxide groups per molecule. In certain embodiments, the epoxy equivalent weight ranges from 100 to 4000 based on solids of the polyepoxide, such as between 100 and 1000. The polyepoxides may be, for example, saturated or unsaturated, and may be, for example, aliphatic, alicyclic, aromatic, or heterocyclic. They may contain substituents such as, for example, halogens, hydroxyl groups, and ether groups.

Suitable classes of polyepoxides include epoxy ethers obtained by reacting an epihalohydrin, such as epichlorohydrin, with a polyphenol in the presence of an alkali. Suitable polyphenols include, for example, resorcinol, catechol, hydroquinone, bis(4-hydroxyphenyl)-2,2-propane (Bisphenol A), bis(4-hydroxyphenyl)-1,1-isobutane, bis(4-hydroxyphenyl)-1,1-ethane, bis(2-hydroxyphenyl)-methane, 4,4-dihydroxybenzophenone, and 1,5-dihydroxynaphthalene. In some cases, the diglycidyl ether of Bisphenol A is especially suitable.

Other suitable polyepoxides include polyglycidyl ethers of polyhydric alcohols and/or polyhydric silicones. Suitable polyhydric alcohols include, without limitation, ethylene glycol, propylene glycol, butylene glycol, 1,6-hexylene glycol, neopentyl glycol, diethylene glycol, glycerol, trimethylol propane, and pentaerythritol. These compounds may also be derived from polymeric polyols, such as polypropylene glycol.

Examples of other suitable polyepoxides include polyglycidyl esters of polycarboxylic acids. These compounds may be formed by reacting epichlorohydrin or another epoxy material with an aliphatic or aromatic polycarboxylic acid, such as succinic acid, adipic acid, azelaic acid, sebacic acid, maleic acid, 2,6-naphthalene dicarboxylic acid, fumaric acid, phthalic acid, tetrahydrophthalic acid, hexahydrophthalic acid, or trimellitic acid. Dimerized unsaturated fatty acids containing about 36 carbon atoms (Dimer Acid) and polymeric polycarboxylic acids, such as carboxyl terminated acrylonitrile-butadiene rubber, may also be used in the formation of these polyglycidyl esters of polycarboxylic acids.

Polyepoxides derived from the epoxidation of an olefinically unsaturated alicyclic compound are also suitable for use in the coating compositions of the present invention. These polyepoxides are nonphenolic and are obtained by epoxidation of alicyclic olefins with, for example, oxygen, perbenzoic acid, acid-aldehyde monoperacetate, or peracetic acid. Such polyepoxides include the epoxy alicyclic ethers and esters well known in the art.

Other suitable polyepoxides include epoxy novolac resins. These resins are obtained by reacting an epihalohydrin with the condensation product of aldehyde and monohydric or polyhydric phenols. A typical example is the reaction product of epichlorohydrin with a phenol-formaldehyde condensate.

Suitable polyepoxides also include epoxy-functional organopolysiloxanes, such as the resins described in U.S. Pat. No. 6,344,520 at col. 3, line 46 to col. 6, line 41, the cited portion of which being incorporated herein by reference.

The coating compositions of the present invention may contain one polyepoxide or a mixture of two or more polyepoxides.

As indicated, in certain embodiments, the compound comprising functional groups reactive with secondary amines of the Michael addition reaction product comprises a compound having two or more ethylenically unsaturated groups. Suitable materials include the polyethylenically unsaturated monomers, such as the di- and higher acrylates described earlier.

In certain embodiments, however, such a compound comprises an oligomer containing polymerizable ethylenic unsaturation. Examples of such oligomers, which are suitable for use in the present invention, include polyurethane acrylates, polyester acrylates, polyether acrylates, polyacrylates derived from polyepoxides, and acrylate functional acrylic polymers. As will be appreciated by those skilled in the art, such oligomers can be prepared from polyurethane polyols, polyester polyols, polyether polyols, polybutadiene polyols, acrylic polyols, and epoxide resins by reacting all or portions of the hydroxyl groups or epoxy groups with acrylic or methacrylic acid. Also, polyols such as pentaerythritol and trimethylol propane, propylene glycol, and ethylene glycol can be used. Acrylate functional compounds can also be obtained by transesterifying polyols with lower alcohol esters of (meth)acrylic acid.

In certain embodiments of the present invention, the compound comprising functional groups reactive with secondary amines of the Michael addition reaction product comprises a tetrafunctional polyester acrylate, such as that which is commercially available from Sartomer under the tradename CN 2262.

The coating compositions of the present invention may contain one compound having two or more ethylenically unsaturated groups or a mixture of two or more compounds having two or more ethylenically unsaturated groups.

In certain embodiments of the present invention, the Michael addition reaction product (component 1) and the compound comprising functional groups reactive with the secondary amines of component 1 (component 2) are present in the composition in amounts such that the molar ratio of reactive groups in component 1 to the reactive groups in component 2 is 0.7 to 1.3, in some cases, 0.9 to 1.1, and, in yet other cases 1:1. Indeed, the present inventors have surprisingly discovered that in certain embodiments of the present invention wherein the aforementioned molar ratio is within such a range, the coating compositions are resistant to cracking after exposure to various environmental conditions, such as those described in the Examples, when applied so as to result in a dry film thickness of up to 20 mils, such as 1 to 20 mils. As used herein, the term "resistant to cracking" means that the completely cured coating exhibits no cracks visible to the naked eye at any distance.

In certain embodiments, the coating compositions of the present invention also comprise a polysiloxane. Suitable polysiloxanes include those of the formula:

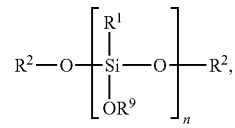

wherein each $R^1$ is independently selected from the group comprising alkyl and aryl radicals, $R^2$ and $R^9$ which may be identical or different, are selected each independently from the group comprising hydrogen, alkyl and aryl radicals, n is selected so that the molecular weight for the polysiloxane is in the range of from 400 to 10,000.

Suitable polysiloxanes include, but are not necessarily limited to, those having a molecular weight ranging from 500 to 6000 and an alkoxy content ranging from 10 to 50%.

Examples of suitable polysiloxanes include, but are not limited to, the alkoxy- and silanol-functional polysiloxanes known to those skilled in the art. Suitable alkoxy-functional polysiloxanes include, but are not limited to: DC-3074 and DC3037 from Dow Corning; Silres SY-550, and SY-231 from Wacker Silicone; and Rhodorsil Resin 10369 A, Rhodorsil 48V750, 48V3500 from Rhodia Silicones; and SF1147 from General Electrics. Suitable silanol-functional polysiloxanes include, but are not limited to, Silres SY 300, Silres SY 440, Silres MK and REN 168 from Wacker Silicone, Dow Corning's DC-840, DC233 and DC-431 HS silicone resins and DC-Z-6018 intermediate and Rhodia Silicones' Rhodorsil Resin 6407 and 6482X.

In certain embodiments, the previously described polysiloxane is present in the coating compositions of the present invention in an amount of up to 40 percent by weight, such as up to 30 percent by weight, based on the total weight of the composition. In certain embodiments, the previously described polysiloxane is present in the coating compositions of the present invention in an amount of at least 5 percent by weight, such as at least 10 percent by weight, based on the total weight of the composition.

The coating compositions of the present invention may also include a cure promoting catalyst, such as a base catalyst. Suitable base catalysts include triphenylphosphine, ethyltriphenyl phosphonium iodide, tetrabutyl phosphonium iodide and tertiary amines, such as benzyldimethylamine, dimethylaminocyclohexane, triethylamine, and the like, N-methylimidazole, and tetrabutyl ammonium hydroxide. When used, such catalysts are, in certain embodiments, present in an amount of 0.1 to 1 percent by weight, based on the total weight of the coating composition.

In certain embodiments, the coating compositions of the present invention also comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used in the coating compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, which is incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating compositions of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in United States Published Patent Application No. 2006-0014099 A1, which is incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

The coating compositions of the present invention can, if desired, be formulated with a variety of organic solvents, such as ketones, including methyl ethyl ketone, hydrocarbons, such as toluene and xylene, and mixtures thereof.

In certain embodiments, however, the coating compositions of the present invention are substantially free, or, in some cases, completely free of any solvent, such as an organic solvent or an aqueous solvent, i.e., water. Stated differently, in certain embodiments, the coating compositions of the present invention are substantially 100% active.

The coating compositions of the present invention can be utilized as one package compositions or as two package compositions. As two packs, one package comprises component 1 described above and the second pack comprises component 2 described above. The previously described additives and other materials can be added to either package as desired or necessary. The two packages are simply mixed together at or near the time of use.

In certain embodiments of the present invention, such as the previously described two package composition, the package comprising the Michael addition reaction product, component 1, also includes a moisture scavenger. Suitable moisture scavenging ingredients include calcium compounds, such as $CaSO_4$-½$H_2O$, metal alkoxides, such as tetraisopropyltitanate, tetra n butyl titanate-silanes, QP-53 14, vinylsilane (A171), and organic alkoxy compounds, such as triethyl orthoformate, trimethyl orthoformate, tetramethyl orthosilicate, and methylorthoformate.

In certain embodiments, the moisture scavenger is present in the package comprising the Michael addition reaction product in an amount of up to 10 percent by weight, such as 0.25 to 9.75 percent by weight, or, in some cases 5 percent by weight, based on the total weight of the Michael addition reaction product.

Indeed, the present inventors have surprisingly discovered that the inclusion of a relatively small amount of moisture scavenger to the Michael addition reaction product prevents the Michael addition reaction product from significantly increasing in viscosity over time. As a result, the present invention is also directed to compositions comprising: (1) an ungelled, secondary amine-containing, Michael addition reaction product of reactants comprising: (a) a compound comprising more than one site of ethylenic unsaturation, and (b) an aminofunctional silane, and (2) a moisture scavenger present in an amount sufficient to produce a composition having a viscosity of no more than D after 42 days at 120° F. when measured in accordance with ASTM D1545-89.

Moreover, the present invention is also directed to multi-pack coating compositions, wherein (A) a first pack comprises (1) an ungelled, secondary amine-containing, Michael addition reaction product of reactants comprising, or, in some cases, consisting essentially of: (a) a compound comprising more than one site of ethylenic unsaturation, and (b) an aminofunctional silane; and (2) a moisture scavenger; and (B) a second pack comprises a compound comprising functional groups reactive with the secondary amine groups of component (1).

The coating compositions of the present invention are suitable for application to any of a variety of substrates, including human and/or animal substrates, such as keratin, fur, skin, teeth, nails, and the like, as well as plants, trees, seeds, agricultural lands, such as grazing lands, crop lands and the like; turf-covered land areas, e.g., lawns, golf courses, athletic fields, etc., and other land areas, such as forests and the like.

Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in, for example, U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co) polymers of (meth) acrylic acid compounds or melamine, dicyanodiamide and/or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface The coating compositions of the present invention can be applied to such substrates by any of a variety of methods including spraying, brushing, dipping, and roll coating, among other methods. In certain embodiments, however, the coating compositions of the present invention are applied by spraying and, accordingly, such compositions often have a viscosity that is suitable for application by spraying at ambient conditions.

After application of the coating composition of the present invention to the substrate, the composition is allowed to coalesce to form a substantially continuous film on the substrate. Typically, the film thickness will be 0.01 to 20 mils (about 0.25 to 508 microns), such as 0.01 to 5 mils (0.25 to 127 microns), or, in some cases, 0.1 to 2 mils (2.54 to 50.8 microns) in thickness.

The coating compositions of the present invention can be cured in a relatively short period of time to provide films that have good early properties which allow for handling of the coated objects without detrimentally affecting the film appearance and which ultimately cure to films which exhibit excellent hardness, solvent resistance and impact resistance. For example, the coating compositions of the present invention can dry in air at low temperatures to a dust free or tack free state in about 30 minutes, in some case 10 minutes or less. Thereafter, they will continue to cure in air at low temperatures so that a completely cured coating is formed in from, for example, 12 hours to 24 hours.

As a result, as previously indicated, the present invention is also directed to methods for coating a substrate. These methods comprise: (A) combining the contents of a first package and a second package, wherein (1) the first package comprises: (a) an ungelled, secondary amine-containing, Michael addition reaction product of reactants comprising, or, in some cases, consisting essentially of: (i) a compound comprising more than one site of ethylenic unsaturation, and (ii) an aminofunctional silane; and (b) a moisture scavenger, (2) the second package comprises a compound comprising functional groups reactive with the secondary amines of the Michael addition reaction product, and (3) the contents of the first package and the second package are combined such that molar ratio of the secondary amines in the Michael addition reaction product to the functional groups reactive with the secondary amines in the resulting combination is 0.7 to 1.3; (B) applying the combination to at least a portion of the substrate; (C) allowing the combination to coalesce form a substantially continuous film; and (D) allowing the combination to completely cure within 24 hours in the presence of air having a relative humidity of 10 to 100 percent and a temperature −10 to 120° C.

Illustrating the invention are the following examples that are not to be considered as limiting the invention to their details. All parts and percentages in the examples, as well as throughout the specification, are by weight unless otherwise indicated.

EXAMPLE 1

A Michael addition product was prepared as follows from the ingredients listed in Table 1.

TABLE 1

| Ingredient | Parts By Weight |
|---|---|
| Charge 1 | |
| γ-aminopropyltrimethoxysilane[1] | 60.0% |
| Charge 2 | |
| 1,6-hexanediol diacrylate | 40.0% |

[1]Silquest A1110 available from GE Silicones.

Charge #1 was added to an appropriate sized, 4-necked flask equipped with a motor driven stainless steel stir blade, water-cooled condenser, and a heating mantle with a thermometer connected through a temperature feedback control device. The contents were stirred under a nitrogen blanket. Charge #2 was added at an appropriate rate to keep the temperature <60° C. Upon completion of Charge #2, the reaction temperature was set to 60° C. The reaction was held at temperature until the disappearance of the acrylate double bond was demonstrated by IR (peak at ~1621 $cm^{-1}$) and/or NMR (peaks at ~5.7-6.4 ppm) analysis.

EXAMPLE 2

Three different samples were prepared by charging a Michael addition product of Example 1, into a container and mixing in the following ingredients as shown in Table 2 under ambient conditions.

TABLE 2

| Ingredient | Sample 3B | Sample 3C | Sample 3D |
|---|---|---|---|
| Product of Example 1 | 100 parts | 100 parts | 100 parts |
| Triethyl orthoformate[2] | 5 parts | 0 | 0 |
| Trimethyl orthoformate[2] | 0 | 5 parts | 0 |
| Tetramethyl orthosilicate[2] | 0 | 0 | 5 parts |

[2]Triethyl orthoformate, trimethyl orthoformate and tetramethyl orthosilicate are available from Sigma Aldrich Company.

EXAMPLE 3

A Michael addition product of Example 1, and Samples "B", "C" and "D", of Example 2 were monitored for changes in viscosity via the Bubble Tube Viscosity method in accordance with ASTM D1545-89. The samples were analyzed after 6 weeks at room temperature and 120° F. and results are set forth in Table 3.

TABLE 3

| Sample | Initial viscosity | Viscosity after 42 days at 70° F. | Viscosity after 42 days at 120° F. |
|---|---|---|---|
| Example 1 | A+ | B + sl | E− |
| 3B | A− | A | B+ |
| 3C | A− | A− | B+ |
| 3D | A− | A − sl | B − sl |

EXAMPLE 4

Coating compositions were prepared by combining the ingredients listed in Table 4 in a suitable container equipped with a paddle blade mixer.

TABLE 4

| Ingredient | Ex. 4A | Ex. 4B | Ex. 4C | Ex. 4D | Ex. 4F | Ex. 4H |
|---|---|---|---|---|---|---|
| Sample 3C | 15 grams (0.037 eq) | — | — | — | — | — |
| Product of Example 1 | — | 15 grams (0.037 eq) | 15 grams (0.037 eq) | 15 grams (0.037 eq) | 15 grams (0.037 eq) | 15 grams (0.037 eq) |
| Eponex 1510[3] | 8 grams (0.037 eq) | 8 grams (0.037 eq) | — | — | 5 grams (0.023 eq) | 12 grams (0.055 eq) |
| CN 2262[4] | — | — | 8 grams | — | — | — |
| BYK 333[5] | 0.01 grams | 0.01 grams | 0.01 grams | 0.01 grams | 0.01 grams | 0.01 grams |
| DBDTL[6] | 0.01 grams | 0.01 grams | 0.01 grams | 0.01 grams | 0.01 grams | 0.01 grams |

[3]Epoxy resin commercially available from Hexion.
[4]Tetrafunctional polyester acrylate resin commercially available from Sartomer.
[5]Polyether modified polydimethylsiloxane surface additive commercially available from Byk-Chemie.
[6]Dibutyltin Dilaurate.

EXAMPLE 5

The coating compositions of Example 4 were coated onto Bonderite 1000 CRS and chrome treated aluminum panels at film thicknesses of 1, 6 and 14 mils. The coated substrates were allowed to stand under ambient conditions for 24 hours, at which time they were completely cured. The samples were then exposed to various environmental conditions as illustrated in Table 5. The samples were then observed for signs of cracking. Results are set forth in Table 5. In Table 5, the term "No Cracking" means that there was no cracking of the film on the sample and the film was 100% continuous as observed with the naked eye. The term "Moderate Cracking" means that there was some cracking of the film on the sample, but there were other areas of the film on the substrate in which the film was continuous. The term "Severe Cracking" means that there was no section on the panel where cracking did not exist and in some locations the film had lifted off or delaminated.

TABLE 5

| Test | Ex. 4A | Ex. 4B | Ex. 4C | Ex. 4D | Ex. 4F | Ex. 4H |
|---|---|---|---|---|---|---|
| Salt Fog - 300 hours (ASTM B117) | No cracking | No cracking | No cracking | Severe Cracking | Moderate cracking at 6 and 14 mils | No cracking |
| Humidity - 300 hours (ASTM D2247) | No cracking | No cracking | No cracking | Severe Cracking | Moderate cracking at 6 and 14 mils | Moderate cracking at 6 and 14 mils |
| QUV 340 - 300 hours (SAE J2020) | No cracking | No cracking | No cracking | Severe Cracking | No cracking | No cracking |
| GM - APG test (20 cycles) | No cracking | No cracking | No cracking | Severe Cracking | Severe Cracking | Moderate cracking at 6 and 14 mils |
| Cycle B (20 cycles) | No cracking | No cracking | No cracking | Severe Cracking | Not tested | Not tested |
| Heat aging - 300 hours at 200° F. | No cracking | No cracking | No cracking | Severe Cracking | Not tested | Not tested |
| Initial Adhesion (ASTM D3359)[7] | 5B | 5B | 3B | B | 4B | 4B |

[7]5B represents 100% adhesion with no tape pick off; 1B represents almost no adhesion with >90% tape pick off.

It will be appreciated by those skilled in the art that changes could be made to the embodiments described above without departing from the broad inventive concept thereof. It is understood, therefore, that this invention is not limited to the particular embodiments disclosed, but it is intended to cover modifications which are within the spirit and scope of the invention, as defined by the appended claims.

We claim:

1. A low temperature, moisture curable coating composition comprising:
   (1) an ungelled, secondary amine-containing, Michael addition reaction product of reactants comprising:
      (a) a compound comprising more than one site of ethylenic unsaturation, and
      (b) an aminofunctional silane;
   (2) a compound comprising functional groups reactive with the secondary amines of the Michael addition reaction product; and
   (3) a polysiloxane.

2. The coating composition of claim 1, wherein components (1) and (2) are present in the composition in amounts such that the molar ratio of the secondary amines to the functional groups reactive with the secondary amines is 0.7 to 1.3.

3. The coating composition of claim 1, wherein the aminofunctional silane comprises a compound having the formula:

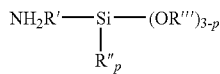

wherein R' is an alkylene group having from 2 to 10 carbon atoms, R" is an alkyl, aryl, alkoxy, or aryloxy group having from 1 to 8 carbon atoms, R''' is an alkyl group having from 1 to 8 carbon atoms, and p has a value of from 0 to 2.

4. The coating composition of claim 3, wherein R' is an alkylene group having from 2 to 5 carbon atoms and p is 0.

5. The coating composition of claim 3, wherein the aminofunctional silane comprises γ-aminopropyltrimethoxysilane.

6. A coating composition comprising:
   (1) an ungelled, secondary amine-containing, Michael addition reaction product of reactants comprising:
      (a) a compound comprising more than one site of ethylenic unsaturation, and
      (b) an aminofunctional silane; and
   (2) a compound comprising functional groups reactive with the secondary amines of the Michael addition reaction product, said compound comprises a polyepoxide, a compound having two or more ethylenically unsaturated groups, or a mixture thereof,
   wherein the Michael addition reaction product is formed from reactants substantially free of a polyamine.

7. The coating composition of claim 1, wherein the Michael addition reaction product is the product of reactants consisting essentially of: (a) a compound comprising more than one site of ethylenic unsaturation, and (b) an aminofunctional silane.

8. The coating composition of claim 1, wherein component (1) is present in the composition in an amount of 30 to 80 percent by weight and component (2) is present in the composition in an amount of 5 to 25 percent by weight, based on the total weight of the composition.

9. The coating composition of claim 1, wherein the compound comprising functional groups reactive with the secondary amines in the Michael addition reaction product is selected from a polyepoxide, a compound having two or more ethylenically unsaturated groups, or a mixture thereof.

10. The coating composition of claim 9, wherein the compound comprising functional groups reactive with the secondary amines in the Michael addition reaction product comprises a polyepoxide.

11. The coating composition of claim 10, wherein the polyepoxide is saturated.

12. The coating composition of claim 11, wherein the polyepoxide is an epoxy ether obtained by reacting an epihalohydrin with a polyphenol.

13. The coating composition of claim 1, wherein the composition is substantially free of solvent.

14. A substrate at least partially coated with a coating deposited from the coating composition of claim 1.

15. A method for depositing a coating on a substrate comprising:
   (a) depositing the coating composition of claim 1 onto at least a portion of the substrate;
   (b) allowing the coating composition to coalesce to form a substantially continuous film; and
   (c) exposing the film to air having a relative humidity of 10 to 100 percent and a temperature of −10 to 120° C.

* * * * *